United States Patent Office 3,356,186
Patented Dec. 5, 1967

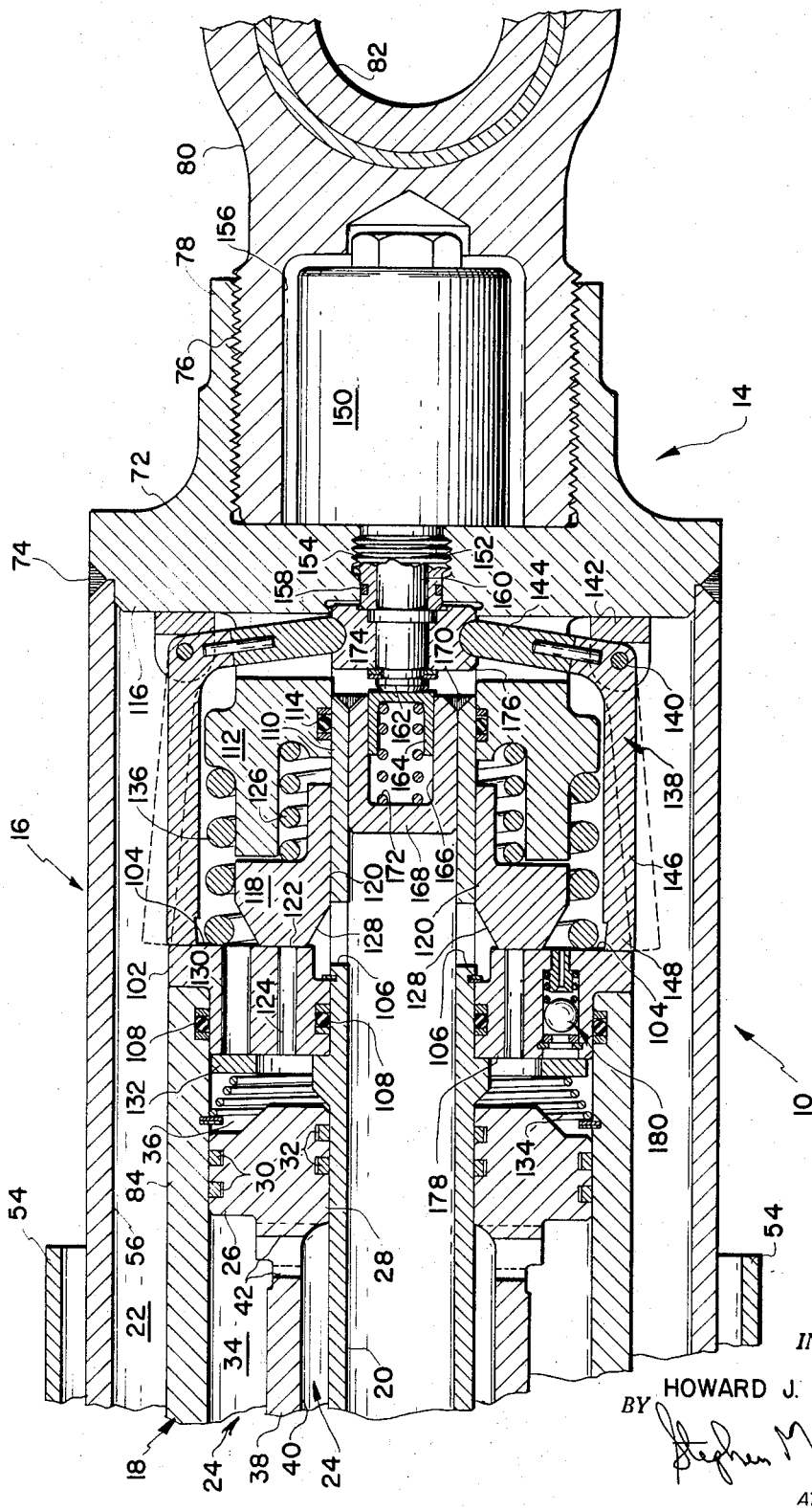

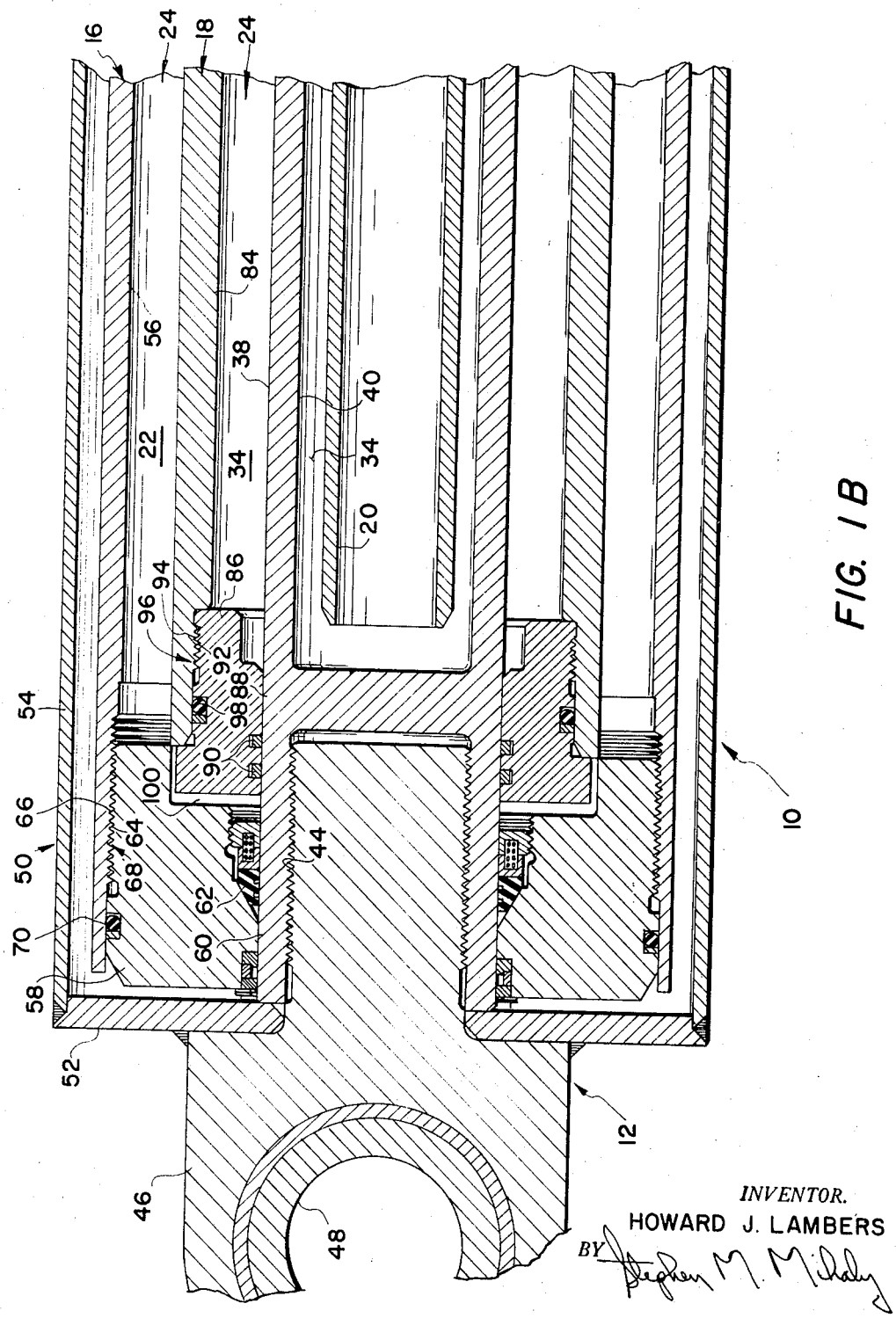

3,356,186
LOCKING MEANS FOR SHOCK ABSORBERS
Howard J. Lambers, Kalamazoo, Mich., assignor to Pneumo Dynamics Corporation, Cleveland, Ohio, a corporation of Delaware
Filed Sept. 15, 1965, Ser. No. 487,451
10 Claims. (Cl. 188—67)

ABSTRACT OF THE DISCLOSURE

This application discloses a telescoping piston-cylinder type of fluid shock absorber wherein fluid is expressed through orifice means to dissipate the energy imparted to the shock absorber. In order to dampen the fluid flow through the orifice means, a suitable biased valve is positioned adjacent the orifice means. In the illustrated embodiment, movable supports are provided for holding an inner casing assembly, which carries the orifice means, away from the valve to allow dampened fluid flow through the orifice means. In order to provide a locked shock absorber, the movable supports are arranged to move to a non-supporting position whereby the inner casing assembly is movable against the valve thereby precluding fluid flow through the orifice means.

---

This invention relates to shock absorbers and more particularly to hydraulic-type shock absorbing devices.

In the normal operation of hydraulic-type shock absorbing devices a valved piston operates in a cylinder to effect displacement of hydraulic fluid in opposite directions through the piston under control of a plurality of resistance valves generally disposed in the piston. Also, the shock absorber is provided with a base valve in the cylinder which resists flow of hydraulic fluid from the cylinder but allows substantially free flow of fluid on return to the cylinder to and from a reservoir provided adjacent the shock absorber cylinder. The reservoir and base valve compensate for the change in the volume of the cylinder due to the swept piston rod volume and due to the contraction and expansion of the fluid with temperature changes.

Shock absorbing devices of the general type have the valving in the piston and the base valve calibrated to provide the desired shock absorber characteristics.

Separate resistance valves are normally provided in the piston to provide for each direction of fluid flow through the piston, each of the resistance valves being calibrated to provide the desired damping characteristic in each direction of piston travel.

Under certain conditions, it may be desirable to provide means to enable a shock absorber to be "locked-up," that is, to prevent all piston motion. Such a locking function is normally provided by auxiliary control means operable to prevent normal operation of the piston valves. Such auxiliary systems, however, may fail to fully prevent fluid flow through the piston valves, especially when the shock absorber is subjected to large forces, or forces maintained for long periods of time.

It is therefore an object of this invention to provide a hydraulic-type shock absorber device with a single pressure operated poppet valve to control both compression and tension damping levels.

Another object of this invention is to provide a hydraulic-type shock absorber device with a solenoid to operate mechanical elements within the shock absorber device to effect either a locked or an unlocked configuration.

A further object of this invention is to provide a hydraulic-type shock absorber device with a pressure operated poppet valve to effect a pressure locking function.

Still another object of this invention is to provide a hydraulic-type shock absorber device with a pressure operated poppet valve to effect a pressure locking function in both tension and compression.

Yet a further object of this invention is to provide a hydraulic-type shock absorber device with a pressure operated poppet valve to effect a pressure locking function which will not allow fluid leakage even under high load conditions.

Another and still further object of this invention is to provide a hydraulic-type shock absorber device with a solenoid to operate mechanical elements within the shock absorber device so as to permit a pressure operated poppet valve to effect a pressure locking function which increases as the force applied to the shock absorber increases.

Another and yet still further object of this invention is to provide a shock absorber having an improved, remote electrically actuated lockout means.

Yet another and still further object of this invention is to provide an improved form of hydraulic shock absorber having superior performance and being of low cost to manufacture.

Other objects, advantages and important features of this invention will be apparent from a study of the specification following, taken with the drawing, which together describe, disclose, illustrate, and show certain embodiments, modifications, procedures and alternatives of the invention and what is now considered and believed to be the best method of practicing the principles thereof. Still other embodiments, modifications, procedures, or equivalents may be subject to those having the benefit of the teaching herein and such other embodiments, modifications, procedures, or equivalents are intended to be reserved especially as they fall within the scope and breadth of the subjoined claims.

In the drawing:

FIGURE 1A is a longitudinal sectional view of one end of a hydraulic type shock absorber device constructed according to this invention; and FIGURE 1B is a longitudinal sectional view of the other end of a hydraulic type shock absorber constructed according to this invention.

Attention is now directed to the drawing wherein there is shown and illustrated a hydraulic-type shock absorber device 10 having an upper or piston assembly 12 and a lower or cylinder assembly 14. The upper or piston assembly 12 is telescopingly engaged with the lower or cylinder assembly 14 to define the extensible hydraulic-type shock absorber device 10.

The cylinder assembly 14 comprises an outer cylinder assembly 16 and an inner cylinder assembly 18, with the inner cylinder assembly 18 being provided with a centrally disposed hollow internal porting tube 20 extending generally axially therewithin. The outer cylinder assembly 16 and the inner cylinder assembly 18 are disposed in substantially concentric relationship relative to each other to define an annular accumulator chamber or reservoir 22 between the outer cylinder assembly 16 and the inner cylinder assembly 18, and a working chamber 24 within the inner cylinder assembly 18.

The piston assembly 12 comprises an annular piston 26 slidably disposed within the inner cylinder assembly 18 and having a bore or surface 28 in surrounding relationship to the internal porting tube 20, that is, the piston is slidable within the working chamber 24. The piston 26 is provided with piston rings 30 on the periphery thereof and porting tube seals 32 in the bore or surface 28 thereof to sealingly cooperate with the inner cylinder assembly 18 and the internal porting tube 20, respectively to define a tension chamber 34 within the upper portion of the working chamber 24 and a compression chamber 36 within the lower portion of the working chamber 24.

The piston assembly 12 further comprises a piston rod 38 of substantially cylindrical configuration integrally attached to the piston 26, and provided with an axially extending bore 40 extending into the lower portion thereof to provide clearance for the internal porting tube 20, and having a plurality of ports 42 transversely extending through the wall of the piston rod 38 adjacent the juncture thereof with the piston 26 to provide fluid communication between the bore 40 and the tension chamber 34.

The upper end of the piston rod 38 is provided with an internally threaded bore 44 to threadedly receive a mounting device 46, such as an upper attach fitting, or the like, which may be provided with an eye 48, or the like, to facilitate in the connection thereof, and with a shield 50 comprising a substantially circular end cap 52 and a tubular casing member 54 depending from the peripheral edge portion of the end cap 52 to protect the shock absorber 10 from dust, water, stones, or the like.

The outer cylinder assembly 16 comprises a tubular cylindrical outer casing 56 which is closed at the upper end thereof by an outer cylinder plug member 58 having a central bore passage 60 axially extending longitudinally therethrough provided with a secondary piston rod seal 62 to slidably, sealingly engage the exterior peripheral surface of the piston rod 38. The peripheral portion of the outer cylinder plug member 58 may be provided with and external screw thread 64 to cooperate with an internal screw thread 66 provided adjacent the upper end portion of the outer casing 56 to provide a screw threaded connection 68 therebetween.

An additional sealing O-ring 70 may be provided to assure proper sealing action between the outer cylinder plug member 58 and the outer casing 56.

The lower end portion of the outer cylinder assembly 16 is closed by an outer cylinder end cap 72 which may be joined to the outer casing 56 in any conventional manner, as by welding connection 74, as shown. The outer cylinder end cap 72 is provided with a threaded bore 76 projecting axially inwardly from the outer surface 78 and terminating within the interior of the outer cylinder end cap 72 to threadedly receive a mounting device, such as a lower attach fitting 80 having an eye 82, or the like, to facilitate in the attachment thereof.

The inner cylinder assembly 18 further comprises a tubular cylindrical inner casing 84, the upper end of which is closed by an annular inner cylinder plug member 86 having a central bore passage 88 extending axially longitudinally therethrough which is provided with a primary piston rod seal 90 to slidably, sealingly engage the exterior peripheral surface of the piston rod 38. The peripheral portion of the inner cylinder plug member 86 may be provided with an external screw thread 92 to engage with an internal screw thread 94 provided adjacent the upper end portion of the inner casing 84 to provide a screw threaded connection 96 therebetween. An additional sealing O-ring 98 may be provided between the inner cylinder plug member 86 and the inner casing 84 to assure proper sealing action between the inner cylinder plug member 86 and the inner casing 84.

The inner cylinder plug member 86 is spaced from the outer cylinder plug member 58 to define a generally annular seal drain 100 therebetween providing fluid communication between the secondary piston rod seal 62 and the primary piston rod seal 90 and the accumulator chamber or reservoir 22.

The lower end of the inner cylinder assembly 18 comprises an annular inner cylinder end cap 102 fixedly interconnecting the lower end of the inner casing 84 to the internal porting tube 20 at a location on the internal porting tube 20 spaced from the lower end portion thereof placing the accumulator chamber or reservoir 22 in fluid communication with the lower end surface 104 of the inner cylinder end cap 102 and with a plurality of porting tube ports 106 extending transversely through the wall of the internal porting tube 20 between the inner cylinder end cap 102 and the outer cylinder end cap 72. A plurality of seals 108 are provided at the juncture of the inner cylinder end cap 102 with the inner casing 84 and the internal porting tube 20 to prevent fluid flow therethrough.

The lower end portion of the internal porting tube 20 is slidably engaged within a centrally disposed bearing passage 110 of a porting tube support block 112 which is provided with an O-ring type seal 114 to sealingly slidably support the lower end of the internal porting tube 20. The internal porting tube support block 112 is mounted to and is integral with the outer cylinder end cap 72 along an upper surface 116 thereof so as to remain fixed thereto while permitting the inner cylinder assembly 18 to reciprocate longitudinally within the outer cylinder assembly 16 for a purpose to be described hereinafter in connection with the locking capability of the shock absorber 10.

A generally annular damping valve poppet 118 having a central bore 120 to permit sliding reciprocating movement along the internal porting tube 20 between the outer cylinder end cap 72 and the porting tube ports 106 to control the damping level of the shock absorber in both compression and tension and to provide the lock up function in a manner hereinafter described.

The damping valve poppet 118 has a valve sealing face 122 provided at the upper end surface thereof substantially perpendicular to the bore 120 to cooperate with a plurality of inner cylinder end cap or damping ports 124 extending axially through the inner cylinder end cap 102 and communicating therethrough with the compression chamber 36.

The damping valve poppet 118 is biased towards and into sealing contact with the lower end surface 104 of the inner cylinder end cap 102 by means of a poppet spring 126 compressed between the damping valve poppet 118 and the porting tube support block 112 to enable the valve sealing face 122 of the damping valve poppet 118 to seal off fluid flow through the inner cylinder end cap ports 124.

The damping valve poppet 118 is also provided with an annular frusto-conical pressure face 128 angularly disposed between the bore 120 and the valve sealing face 122 thereof at the upper end of the poppet 118 and adjacent the porting tube ports 106 to enable fluid pressure applied to either the pressure face 128 or to the valve sealing face 122 to move the damping valve poppet 118 towards the outer cylinder end cap 72, thereby opening the inner cylinder end cap or damping ports 124 and permitting fluid flow therethrough from the working chamber 24 into the accumulator chamber 22 and between the compression chamber 36 and the tension chamber 34 then through the internal porting tube 20 by means of the porting tube ports 106.

The fluid return port 130 is also provided through the inner cylinder end cap 102, having an inner cylinder check valve plate 132 positioned within the compression chamber 36 adjacent the inner termination of the fluid return port 130 and biased thereagainst by means of a check valve plate return spring 134 to permit fluid flow from the accumulator chamber 22 into the compression chamber 36 through the fluid return port 130 while preventing fluid flow therethrough from the compression chamber 36 into the accumulator chamber 22.

The inner cylinder assembly 18 is likewise biased towards the upper end of the shock absorber 10 by an inner cylinder return spring 136 compressed between the lower end surface 104 of the inner cylinder end cap 102 and the porting tube support block 112.

A plurality of locking fingers 138 are each pivotally mounted on a locking finger pivot pin 140 carried by a locking finger pivot support block 112 mounted on the upper surface 116 of the outer cylinder end cap 72. The locking fingers 138 are each generally of an "L" configuration, having an actuator leg 144 and a locking leg 146 projecting at substantially right angles from one another, the pivot pin 140 being disposed at a location substantially at the junction of the actuator leg 144 and the locking leg 146.

The locking fingers 138 are so configured and arranged as to be capable of preventing movement of the inner cylinder assembly 18 towards the lower end of the shock absorber 10 when the tips 148 of the locking legs 146 are positioned adjacent the lower end surfaces 104 of the inner cylinder end cap 102 by defining a rigid stop member between the inner cylinder end cap 102 and the outer cylinder end cap 72. The locking fingers 138 are further so configured and arranged as to be pivoted by remotely actuated means, hereinafter described, to a position wherein the locking legs 146 thereof are pivoted outwardly, enabling the tips 148 thereof to be positioned exteriorly of the periphery of the inner cylinder end cap 102, thereby permitting longitudinal sliding movement of the inner cylinder assembly 18 towards the outer cylinder end cap 72 to effectuate the lock up function hereinbefore mentioned and hereinafter described. The normal position of the locking fingers 138, effectuated by biasing means hereinafter described, is such that the locking legs 146 thereof are positioned between the inner cylinder end cap 102 and the outer cylinder end cap 72, thereby preventing longitudinal movement of the inner cylinder assembly 18.

A remotely controllable actuating means, such as an electric solenoid 150, is mounted to the outer cylinder end cap 72 substantially centrally thereof and within the threaded bore 76. The solenoid 150 may be of any standard construction and design having an externally threaded portion 152 projecting therefrom for threadedly affixing the solenoid 150 to an internally screw threaded passage 154 extending axially through the outer cylinder end cap 72 between the upper surface 116 thereof and the threaded bore 76 therein.

The lower attachment fitting 80 is provided with a recess 156 to receive the solenoid 150 therein. The interconnection between the threaded portion 152 of the solenoid 150 and the internally threaded passage 154 of the outer cylinder end cap 72 is provided with a fluid pressure sealing member 158 to prevent fluid flow therethrough.

A reciprocable solenoid shaft 160 projects upwardly through the externally threaded portion 152, then through the outer cylinder end cap 72 and the outer cylinder assembly 16 and into the interior of the outer cylinder assembly 16, that is, into the accumulator chamber of reservoir 22.

The outboard end portion 162 of the solenoid shaft 160 carries a generally cup shaped solenoid shaft outer bearing slider 164 which is slidably telescopingly received with a bore 166 of a generally cup shaped solenoid shaft outer bearing guide 168 structurally fixedly connected to and within the lower end portion of the internal porting tube 20, as by a welded connection 170. A solenoid return spring 172 is disposed within the bore 166 of the solenoid shaft outer bearing guide 168, compressed between the solenoid shaft outer bearing guide 168 and the solenoid shaft outer bearing slider 164 to bias the solenoid shaft 160 towards the lower end of the cylinder assembly 14.

Structurally associated with the solenoid shaft 160, as by a clip 174, is a locking finger actuator 176 for pivoting the locking fingers 138 about the locking finger pivot pins 140 when the locking finger actuator 176 is reciprocated by the solenoid shaft 160.

As mentioned hereinbefore, the locking fingers 138 are so configured and arranged as to prevent movement of the inner cylinder assembly 18 towards the lower end of the shock absorber 19 when the locking fingers 138 are in the normal, unactuated position effectuated by the biasing action of the solenoid return spring 172 on the solenoid shaft 160 and attached locking finger actuator 176, but to permit movement of the inner cylinder assembly 18 towards the lower end of the shock absorber 10 against the biasing of the inner cylinder return spring 136 when the locking fingers 138 are pivoted to the actuated position whereat the tips 148 thereof are positioned exteriorly of the periphery of the inner cylinder end cap 102, corresponding to the actuated position of the solenoid shaft 160 of the solenoid 150.

Having now disclosed and described the structural aspects of the elements of the shock absorbing device 10 and the manner in which the elements are interrelated, the operation of the shock absorber 10 in both the unlocked and locked conditions thereof should now be readily apparent.

When forces are applied to the upper attach point 46 and to the lower attach point 80 which tend to compress the shock absorber 10, with the locking fingers 138 in the normal unactuated position, motion of the piston 26 will build up hydraulic pressure in the compression chamber 36 until the hydraulic pressure in the compression chamber 36, acting against the valve sealing face 122 of the damping valve poppet 118 through the inner cylinder end cap ports 124, produces a force against the valve sealing face 122 which is greater than the preload applied to the poppet spring 126 when compressed between the damping valve poppet 118 and the porting tube support block 112 during assembly therebetween. This force will open the damping valve poppet 118 by sliding the poppet 118 along the internal porting tube 20 towards the lower end of the shock absorber 10. The piston 26 will therefore move within the working chamber 24, decreasing the volume of the compression chamber 36, and displacing hydraulic fluid out of the compression chamber 36 through the inner cylinder end cap ports 124 against the controlled pressure head generated by the preload and spring rate of the poppet spring 126. The area of the valve seating pressure face 122 of the damping valve poppet 118 also is a factor in determining the pressure head applied to the hydraulic fluid as it is forced out of the compression chamber 36 through the inner cylinder end cap ports 124, and therefore the damping rate applied to the piston movement and the rate of contraction of the shock absorber 10.

The hydraulic fluid discharged from the compression chamber 36 through the inner cylinder end cap ports 124 by the movement of the piston 26 will be forced into the tension chamber 34 by means of the porting tube ports 106, through the hollow interior of the internal porting tube 20, and through the ports 42 in the piston rod 38. The hydraulic fluid in excess of that required to maintain the tension chamber 34 filled, which excess occurs due to the swept piston rod volume, is ported into the accumulator chamber or reservoir 22 of the shock absorber 10 by passing outwardly along the valve sealing face 122 of the damping valve poppet 118 and beyond the periphery thereof into the accumulator chamber 22. The accumulator chamber 22 is preferably initially partially filled with air to provide for the compressibility needed to compensate for the change in the volume of the working chamber 24 due to the swept piston rod volume and due to the expansion and contraction of the hydraulic fluid with temperature changes.

If tension forces are applied to the upper attachment point 46 and to the lower attachment point 80, so as to tend to extend the shock absorber 10, the resulting motion of the piston 26 will build up hydraulic pressure in the tension chamber 34 until this pressure, transmitted through the hollow interior of the internal porting tube 20 and through the porting tube ports 106, acting against the pressure face 128 of the damping valve poppet 118, that is, between the valve sealing face 122 and the bore 120 thereof, produces a force component parallel to the longitudinal axis of the shock absorber 10 greater than the preload of the poppet spring 126. This force component will then slide the damping valve poppet 118 towards the lower end of the shock absorber 10, displacing the valve sealing face 122 of the damping valve poppet 118 from the lower end surface 104 of the inner cylinder end cap 102 and permitting fluid flow through and past the valve sealing face 122 of the damping valve poppet 118 and into the compression chamber 36 through the inner cylinder end cap ports 124.

A uniform pressure head will be maintained on the hydraulic fluid flowing from the tension chamber 34 by the damping valve poppet 118 and the poppet spring 126. The projected area of the pressure face 128 which is perpendicular to the longitudinal axis of the shock absorber 10 will assist in determining the magnitude of the uniform and controlled pressure head applied to the fluid discharged from the tension chamber 34. As the projected area of the pressure face 128 may differ from, or be the same as, the area of the valve sealing face 122, the pressure head applied to the hydraulic fluid may differ in compression and tension or may be the same, respectively.

As the piston 26 is displaced by the tension forces applied to the upper attach point 46 and the lower attach point 80, with the rate of displacement being regulated by the damping valve poppet 118 and the poppet spring 126, additional hydraulic fluid necessary to compensate for the swept piston rod volume will be drawn into the compression chamber 36 from the accumulator chamber 22 through the fluid return port 130 past the inner cylinder check valve plate 132.

When it is desired to hydrostatically lock the shock absorber 10, a control voltage is applied to energize the solenoid 150, thereby extending the solenoid shaft 160 outwardly from the solenoid 150 against the biasing of the solenoid return spring 172. The outward movement of the solenoid shaft 160 displaces the locking finger actuator 176 from the outer cylinder end cap 72, thereby pivoting the locking fingers 138 about the pivot pins 140, and moving the tips 148 of the locking legs 146 thereof outwardly of the periphery of the inner cylinder end cap 102.

When a compressive load is applied to the shock absorber 10, with the locking fingers 138 in the actuated position thereof, that is, with the tips 148 of the locking legs 146 positioned outwardly of the periphery of the inner cylinder end cap 102, the hydraulic pressure developed in the compression chambear 36 acting against the inner surface 178 of the inner cylinder end cap 102 will move the inner cylinder assembly 18 towards the lower end of the shock absorber 10, the periphery of the inner cylinder end cap 102 passing inwardly of the tips of the locking legs 146 of the locking fingers 138.

Since the cylinder area of the inner surface 178 of the inner cylinder end cap 102 is greater than the area of the valve sealing face 122 of the damping valve poppet 118, the force developed against the inner surface 178 of the inner cylinder end cap 102 is greater than the force developed against the valve sealing face 122 of the damping valve poppet 118 and the inner cylinder end cap 102 will therefore be forced against the damping valve poppet 118, the inner cylinder end cap 102 and the damping valve poppet 118 moving together, and precluding fluid flow outwardly through the inner cylinder end cap ports 124. The force developed on the inner surface 178 of the inner cylinder end cap 102 will move the inner cylinder assembly 18 and the damping valve poppet 118 towards the lower end of the shock absorber 10, against the biasing of the inner cylinder return spring 136 and the poppet spring 126 until the damping valve poppet 118 bottoms against the porting tube support blocks 112, thus preevnting the damping valve poppet 118 from opening. With the damping valve poppet 118 closed, fluid flow outwardly from the compression chamber 36 is precluded and the trapped hydraulic fluid in the compression chamber 36 prevents the piston 26 from moving, thereby providing a lock-up condition for the shock absorber 10.

As the force developed against the inner surface 178 of the inner cylinder end cap 102 increases at a greater rate than does the force developed therebetween increases with the increases in the magnitude of compression loads applied to the shock absorber 10, and leakage from the compression chamber 36 when the shock absorber 10 is in the lock-up condition is effectively precluded, even under very high compression loads or loads maintained for long durations of time.

When the compression load is removed from the shock absorber 10, the inner cylinder return spring 136 and the poppet spring 126 move the inner cylinder assembly 18 and the damping valve poppet 118 back to the normal position as illustrated in the drawing. A pressure bleed valve 180, provided in the inner cylinder end cap 102 allows a low rate of fluid flow to bleed from the compression chamber 36 during this small return movement of the inner cylinder assembly 18. With the inner cylinder assembly 18 returned to the initial position, de-energization of the solenoid 150 will allow the locking fingers 136 to move back to the locking position thereof due to the biasing action of the solenoid return spring 172 against the locking finger actuator 176. The shock absorber 10 is thereby returned to the normal, unlocked condition, wherein normal shock absorber action occurs as described hereinabove.

When tensile forces are applied to the shock absorber 10, with the locking fingers 138 in the actuated position thereof, the hydraulic pressure developed in the tension chamber 34 will act against the bottom of the cup-shaped solenoid shaft outer bearing guide 168 through the hollow interior passage of the internal porting tube 20. As the lower end of the solenoid shaft outer bearing guide 168 is exposed only to the accumulator pressure occuring in the accumulator chamber 22, the force developed on the solenoid shaft outer bearing guide 168 tends to move the internal porting tube 20 and the inner cylinder assembly 18 towards the lower end of the shock absorber 10.

This developed force is greater than the effective tension area on the damping valve poppet and causes the inner cylinder assembly 18 and damping valve poppet 118 to move towards the lower end of the shock absorber, as above, trapping the hydraulic fluid within the tension chamber 34, and hydrostatically locking the shock absorber 10. When the tensile load is removed, the inner cylinder assembly 18 returns to the initial position thereof, as described above, allowing the locking fingers 138 to return to the normal unactuated position thereof when the solenoid 150 is de-energized.

While the invention has been shown, illustrated, described and disclosed in terms of certain preferred embodiments or modifications which it has assumed in practice, the scope of the invention should not be deemed limited by the precise certain embodiments or modifications herein shown, described, illustrated and disclosed, such other embodiments or modifications being intended to be reserved especially as they fall within the scope and breadth of the claims hereto appended.

I claim as my invention:

1. A shock absorber comprising, in combination:
    an outer assembly,
    an inner assembly disposed within said outer assembly and defining therewith a reservoir therebetween,
said inner assembly comprising
a tubular inner casing,
an annular end cap closing one end of said inner casing and having a centrally disposed bore extending generally longitudinally therethrough,
said end cap being provided with a plurality of damping ports extending generally longitudinally therethrough,
an elongate hollow porting tube having one end open, said tube extending generally longitudinally through the bore of said end cap,
said end cap being structurally affixed to and supported by said hollow porting tube at a location therealong which is generally longitudinally spaced from the other end portion of said porting tube,
said other end portion of said porting tube projecting exteriorly of said end cap and being supported by said outer assembly,
said porting tube being provided with a plurality of generally transversly disposed ports located in the wall thereof at locations adjacent to and exteriorly of said end cap,
a piston assembly reciprocatably disposed within said inner assembly and so constituted and arranged therewith as to enable said piston assembly to displace fluid therein generally outwardly therefrom through said damping ports during compression loading of the shock absorber and through said transversely disposed ports during tensile loading thereof as said piston assembly moves therethrough, and
valving operatively associated with said porting tube to control fluid flow through said damping and through said transversely disposed ports during both directions of movement of the piston assembly to define a controlled pressure head for such fluid during the flow thereof through said damping and said transversely disposed ports.

2. The shock absorber as defined as claim 1, wherein:
said valving comprises
a valve poppet slidably disposed on said porting tube between said end cap and said outer assembly, and
biasing means operatively associated with said damping valve poppet effective to bias said valve poppet into sealing engagement with said inner cap.

3. The shock absorber as defined in claim 1, wherein said valving comprises
an annular damping valve poppet having generally axially extending bore therethrough,
said damping valve poppet being slidably disposed on said porting tube between said end cap and said outer assembly,
a valve sealing face on one end surface of said damping valve poppet,
said sealing face being so arranged and constituted for sealing said damping ports in said end cap and prevent flow of fluid therethrough,
an angularly disposed frusto-conical pressure face on said damping valve poppet disposed between the bore therein and the sealing face thereon,
said damping valve poppet being so constituted and arranged for sealing said transverse ports to prevent flow of hydraulic fluid therethrough, and
biasing means operatively associated with said damping valve poppet effective to bias the sealing face thereof into sealing engagement with said end cap,
said damping valve poppet being effective to provide a controlled pressure head to hydraulic fluid displaced generally outwardly through said damping ports by said piston assembly during movement of said piston assembly due to compression loading and displaced generally outwardly through said porting tube and the transverse ports thereof during movement of said piston assembly due to tensile loading on the shock absorber.

4. In a hydraulic shock absorber, the combination comprising:
an outer cylinder assembly comprising
a tubular outer casing,
an outer end cap closing one end of said outer casing,
an annular outer plug member closing the other end of said outer casing,
said outer plug member having a centrally disposed bore extending generally longitudinally therethrough, and
an attachment fitting structurally associated with said outer end cap;
an inner cylinder assembly concentrically disposed within said outer cylinder assembly and defining therewith an annular accumulator chamber therebetween,
said inner cylinder assembly comprising
a tubular inner casing,
an annular inner end cap closing one end of said inner casing,
said inner end cap having a centrally disposed bore extending generally longitudinally therethrough,
said inner end cap being further provided with damping and fluid return ports extending generally longitudinally therethrough,
check valve means operatively associated with said fluid return port to enable fluid flow therethrough inwardly from said accumulator chamber into the interior of said inner casing while preventing fluid flow therethrough outwardly from the interior of said inner casing into said accumulator chamber,
an elongate hollow porting tube having one end portion thereof open,
said porting tube extending generally axially through the bore of said inner end cap and being disposed generally concentrically relative to the inner casing with the one end portion of said porting tube being positioned interiorly of said inner casing,
said inner end cap being structurally affixed to and supported by said hollow porting tube at a location therealong spaced from the other end portion of said porting tube,
said other end portion of said porting tube projecting exteriorly of said inner end cap and being supported by said outer end cap,
said porting tube being provided with a plurality of generally transversely opening ports located in the wall thereof at locations therealong which are adjacent to and exteriorly of said inner end cap, and
an annular inner plug member having a centrally disposed bore therethrough closing the other end of said inner casing;
a piston assembly,
said piston assembly comprising:
an elongate substantially circular piston rod reciprocatably supported by the bores of said plug members,
an annular piston integrally affixed to and structurally associated with one end portion of said piston rod,
said piston being reciprocatably disposed within said inner casing of said inner cylinder assembly and having a centrally disposed bore to enable passage therethrough of said porting tube,
said piston rod further having a generally longitudinally disposed bore therein extending from the one end portion thereof,
said piston rod bore being aligned and in communication with the bore of said piston to provide clearance for said porting tube,
said piston rod still further having a plurality of generally transversely extending ports positioned at locations adjacent the juncture of the piston rod with said piston,
an attachment fitting structurally associated with the other end portion of said piston rod to enable said piston assembly to be structurally associated with a loading means,
said piston being provided with a sealing means operative between said piston and said inner cylinder assembly to enable reciprocating movement of said piston therewithin to displace hydraulic fluid outwardly through said damping ports of said inner end cap during compression loading and to displace hydraulic fluid outwardly through said hollow porting tube during tensile loading; and an annular damping valve poppet having a generally axially extending bore therethrough, said damping valve poppet being slidably disposed on said porting tube between said inner end cap and said outer end cap;

a valve sealing face on one end surface of said damping valve poppet so arranged and constituted for sealing said damping ports in said inner end cap to prevent flow of hydraulic fluid therethrough;

an angularly disposed frusto-conical pressure face on said damping valve poppet located between said valve sealing face and the bore thereof;

said damping valve poppet being so constituted and arranged for sealing said transverse ports and thereby prevent flow of hydraulic fluid therethrough; and biasing means operatively associated with said damping valve poppet effective to bias said valve sealing face thereof into sealing engagement with said inner end cap, said biasing means comprising a compression spring in surrounding relationship to said porting tube and positioned between said damping valve poppet and said outer end cap, said damping valve poppet being effective thereby to provide a controlled pressure head for hydraulic fluid displaced outwardly through said damping ports by said piston during movement of said piston due to compression loading, said damping valve poppet being further effective thereby to provide a controlled pressure head to hydraulic fluid displaced outwardly through said porting tube and transverse ports thereof during movement of said piston due to tensile loading.

5. A shock absorber comprising, in combination:

an outer assembly, an inner assembly reciprocably disposed with said outer assembly and defining therewith a reservoir therebetween, a piston assembly reciprocably disposed within said inner assembly and so constituted and arranged therewith as to enable said piston assembly to displace fluid therein generally outwardly therefrom through porting provided therein as said piston assembly moves therethrough, biased valve means operatively associated with said porting for damping fluid flow therethrough during movement of the piston assembly by providing a controlled pressure head to such fluid during the flow thereof through said porting, a plurality of locking fingers pivotable between a plurality of positions, one of said positions defining an unlocked position wherein said locking fingers are positioned so as to prevent movement between the inner assembly and said outer assembly and thus enable damped movement of said piston assembly within said inner assembly, another of said positions defining a locked position wherein said locking fingers are positioned so as to permit movement between said inner assembly and said outer assembly, said movement of said inner assembly being effective to hold said valving in a closed position to prevent movement of said piston assembly within said inner assembly, and means for moving said locking fingers between said positions.

6. A hydraulic shock absorber remotely operated between locked and unlocked conditions comprising, an outer cylinder assembly having a tubular outer casing, an outer end cap closing one end portion of said outer casing, an annular outer plug member closing the other end portion of said outer casing, said plug member having a centrally disposed bore extending generally longitudinally therethrough, and a fitting structurally associated with said outer end cap to enable said outer cylinder assembly to be structurally associated with a loading means;

an inner cylinder assembly concentrically disposed and longitudinally reciprocable within said outer cylinder assembly and defining therewith an annular accumulator chamber therebetween, said inner cylinder assembly comprising a tubular inner casing, an annular inner end cap closing one end portion of said inner casing, said inner cap having a centrally disposed bore extending generally longitudinally therethrough, said inner end cap being provided with a plurality of damping ports extending generally longitudinally therethrough, a fluid return port extending generally longitudinally therethrough in fluid communication with said accumulator chamber, and a pressure bleed valve to enable hydraulic fluid to bleed therefrom in the absence of a load, check valve means operatively associated with said fluid return port to enable fluid flow therethrough inwardly from said accumulator chamber into the interior of said inner casing while preventing fluid flow therethrough outwardly from the interior of said inner casing into said accumulator chamber, an elongate hollow porting tube having one end portion thereof open, said porting tube extending generally axially through the bore of said inner end cap and being disposed generally concentrically relative to the inner casing, said one end portion of said porting tube being positioned interiorly of said inner casing, said inner end cap being structurally affixed to and supported by said hollow porting tube at a location therealong which is spaced from the other end portion thereof, said other end portion of said porting tube projecting exteriorly of said inner end cap and being reciprocatably supported by said outer end cap at a location which is generally centrally located thereon, said porting tube being provided with a plurality of generally transversely opening ports located in a wall thereof at locations which are adjacent to and exteriorly of said inner end cap, and an annular inner plug member having a centrally disposed bore therethrough closing the other end portion of said inner casing;

a piston assembly, said piston assembly comprising:

an elongate substantially circular piston rod reciprocatably supported by the bores of said plug members, an annular piston integrally affixed to and structurally associated with one end portion of said piston rod and reciprocatably disposed within said inner casing of said inner cylinder assembly, said piston having a centrally disposed bore to enable passage therethrough of said porting tube, said piston rod having a generally longitudinally extending bore therein which is aligned and in communication with the bore of said piston to provide clearance for said porting tube, said piston rod further having a plurality of generally transversely opening ports extending therethrough at locations which are adjacent the juncture of said piston rod with said piston, a fitting structurally associated with the other end portion of said piston rod to enable said piston assembly to be structurally associated with a loading means, and shield means carried by said other end portion of said piston rod and reciprocable therewith;

sealing means being operative between said piston and said inner cylinder assembly to enable reciprocating movement of said piston therewithin to displace hydraulic fluid outwardly through said damping ports of said inner end cap during compression loading and to displace hydraulic fluid outwardly through said hollow porting tube during tensile loading;

an annular damping valve poppet having a generally axially extending bore therein, said damping valve poppet being slidably disposed on said porting tube between said inner end cap and said outer end cap;

a valve sealing face on one end surface of said damping valve poppet for sealing said damping ports in said inner end cap to prevent flow of hydraulic fluid therethrough;

an angularly disposed frusto-conical pressure face on said damping valve poppet between said valve sealing face and the bore thereof;

said damping valve poppet being so constituted and arranged for sealing said transverse ports and thereby prevent flow of hydraulic fluid therethrough;

biasing means operatively associated with said damping valve poppet effective to bias said valve sealing face thereof into sealing engagement with said inner end cap, said damping valve poppet being effective thereby to provide a controlled pressure head to hydraulic fluid which may be displaced outwardly through said damping ports by said piston during movement of said piston due to compression loading, said damping valve poppet being further effective thereby to provide a controlled pressure head to hydraulic fluid displaced outwardly through said porting tube and the transverse ports thereof during movement of said piston due to tensile loading;

at least one elongate structure pivotally associated with said outer end cap and pivotable thereon between a plurality of positions, said structure having a locking leg piston and an actuating leg portion, one of said positions of said structure defining an unlocked position locating the locking leg portion between the inner end cap and the outer end cap to prevent reciprocation of said inner cylinder assembly within said outer cylinder assembly, another of said positions of said structure defining a locked position locating the locking legs portion exteriorly of the periphery of said inner end cap to enable reciprocation of said inner cylinder assembly within said outer cylinder assembly;

an electrically actuable solenoid structurally associated with said shock absorber; and means associated with said solenoid and said actuating legs portion to enable said solenoid to pivot said structure between said positions.

7. A shock absorber comprising:
an outer assembly;
an inner assembly reciprocably movably disposed within the outer assembly, the inner assembly having a ported portion providing communication between the inner and outer assemblies;
a piston assembly reciprocably disposed within the inner assembly and so constituted and arranged as to enable the piston assembly to displace fluid in the inner assembly through the ported portion;
valve means operatively associated with the ported portion for damping fluid flow therethrough during movement of the piston assembly by providing a controlled pressure head to such fluid during the flow thereof through the ported portion; and
means for selectively precluding and allowing movement of the inner assembly for respectively unlocking the piston for movement and locking the piston against substantial movement.

8. The shock absorber of claim 7 wherein
the valve means comprises a valve poppet slidably mounted within the outer assembly and exteriorly of the inner assembly; and
means biasing the valve poppet against the ported portion of the inner assembly.

9. The shock absorber of claim 8 wherein
the inner assembly comprises an end wall providing a bore therethrough and a passageway therethrough;
the inner and outer assemblies being spaced apart to define a reservoir therebetween;
the piston assembly comprises:
    a piston having a bore therethrough;
    a hollow piston rod having a bore larger than the piston bore and at least one transverse opening providing communication between the piston rod bore and the inner assembly on one side of the piston; and
    further comprising:
        a porting tube received within the bores of the end wall, the piston and the piston rod, the porting tube having a first opening in communication with the reservoir between the inner and outer assemblies and a second opening in communication with the piston rod bore; and
        a check valve associated with the end wall passageway for allowing fluid flow into the space between the piston and the inner assembly and precluding reverse flow therethrough.

10. A shock absorber comprising:
an outer assembly;
an inner assembly disposed within the outer assembly and defining a reservoir therebetween, the inner assembly being reciprocable with respect to the outer assembly and having porting therein;
a piston assembly reciprocably disposed within the inner assembly and so constituted and arranged therewith as to enable the piston assembly to displace fluid therein generally outwardly therefrom through the porting as the piston assembly moves therethrough, and
means for selectively precluding and allowing movement of the inner assembly, the means comprising:
    a plurality of generally L-shaped members, each of the L-shaped members having an actuating leg and a locking leg;
    means mounting each of the L-shaped members to the outer assembly for pivotal movement about an axis adjacent the intersection of the actuating leg and the locking leg, the L-shaped members being so arranged and positioned as to be movable between a locked position wherein the locking legs abut the inner assembly and preclude further movement thereof toward the L-shaped members and an unlocked position wherein the locking legs are substantially disposed in the reservoir between the inner assembly and the outer assembly; and means for selectively moving the L-shaped members between the locked and unlocked positions.

References Cited

UNITED STATES PATENTS

| | | | |
|---|---|---|---|
| 1,613,782 | 1/1927 | Bauer | 188—97 |
| 2,626,685 | 1/1953 | Brundrett | 188—88 |
| 2,809,721 | 10/1957 | Knights | 188—67 |
| 3,039,566 | 6/1962 | Rumsey | 188—100 |
| 3,275,277 | 9/1966 | Illar et al. | 188—88 |

FOREIGN PATENTS

| | | |
|---|---|---|
| 1,138,400 | 1/1957 | France. |

MILTON BUCHLER, *Primary Examiner.*

G. E. HALVOSA, *Assistant Examiner.*